United States Patent Office 3,306,779
Patented Feb. 28, 1967

3,306,779
FUEL CELL ELECTRODE AND A PROCESS FOR MAKING THE SAME
Robert J. Flannery, Olympia Fields, Ill., and Ahmad Sam, Hammond, Ind., assignors to Standard Oil Company, Chicago, Ill., a corporation of Indiana
No Drawing. Filed July 1, 1965, Ser. No. 468,976
12 Claims. (Cl. 136—120)

This invention relates to fuel cells operating with hydrocarbons at low temperatures and more particularly to the control of wettability of the electrodes for such cells. In addition, it relates to the use of particular processing conditions for the manufacture of the electrodes. The resultant electrodes exhibit controlled wettability and improved performance at low catalyst loadings, in addition to other advantages.

Fuel cells adapted for producing electrical energy from chemical fuels are well known (see "Fuel Cells," edited by G. J. Young, Reinhold Publishing Corporation, New York, N.Y., 1960). In general fuel cells are electrochemical devices which convert the chemical energy of a fuel directly into electrical energy by the oxidation of fuel supplied to the cell. The fuel cell as a device is composed of two electrodes adjacent to and in contact with an electrolyte, with means for supplying a fuel to one electrode and an oxidant to the other electrode. An electrode contains a catalyst for promoting the reaction of the fuel and oxidant individually with the electrolyte and a conducting material for extraction of/or supply of electrons. In order to provide maximum surface area of the catalytic ingredient, a support is also utilized in the electrode.

In general, fuel cells operate at certain either high temperature or low temperatures with the latter requiring greater activity of the catalyst for the same performance. In some low temperature fuel cells operating at temperatures below about 300° C., ethylene, ethanol, carbon monoxide or other hydrocarbon or derivative is supplied to one of the electrodes. In some instances, a liquid hydrocarbon fuel may also be utilized. As is known, hydrocarbon fuels because of their low cost and greater ease of storage are the more desirable fuels, although they are more difficult to react in the fuel cell.

The overall efficiency of the fuel cell is directly related to the promotional effect of the catalytic agent on the individual electrodes and the ability of the electrodes to provide suitable contact surfaces for the fuel and the electrolytes. The greater the activity of the catalyst agent, the smaller the energy loss in the formation of the electrons at the fuel electrode and the consumption of the electrons at the oxidant electrode. In addition, the characteristics of the electrode support are important since the support provides a surface area for the three-phase contact by the gaseous fuel or oxidant, catalyst, and electrolyte.

Heretofore, active electrodes with platinum or platinum alloys have been made of metal or alloy powders bound together with various common materials such as paraffin wax, polyolefins or polyperfluoro-olefin polymers. Such electrodes contain typically 20–50 grams of catalyst per square foot of electrode area, which in the most favorable cases still results in relatively high catalyst costs. Such costs should be reduced by 1–2 orders of magnitude in order to produce practical fuel cell electrodes.

We have found that electrodes with low catalyst loadings below 20 g./ft.$^2$ can be made which produce significantly improved outputs, by controlling the wettability of the electrode support and by proper catalyst dispersion. We have also found that particular processing techniques are required to produce certain desired electrode properties. Our electrodes of this invention are capable of operating efficiently with catalyst loadings in the range of 2 g./ft.$^2$ which may be further reduced by selective catalyst placement in a laminar structure.

In addition, we have found that the combination of this electrode support and a catalyst, which contains platinum and a second metal which is partially leachable from the platinum, provides fuel cell electrodes which produce current densities up in the order of 40 ma./cm.$^2$ at catalyst loadings as low as 2 g./ft.$^2$.

Briefly, the invention is directed to a multi-layer fuel cell electrode which is suitable for use in conjunction with an electrolyte in the direct oxidation of hydrocarbons at low temperatures below about 300° C., and exhibits controlled wettability and improved performance at low catalyst loadings below about 20 g./ft.$^2$. The electrode comprises at least two layers containing a current collector, with each layer being composed of a compressed combination of particles of a non-wettable, inert, insoluble, acid-resistant, polymeric thermoplastic such as polyperfluoro-ethylene and particles of wettable carbon having a size in the range of 10 m.$^2$/g.–200 m.$^2$/g. At least one of the layers is wettable by the electrolyte but has pores of sufficient size to prevent total flooding of the layer and has a weight ratio of thermoplastic to carbon of about 5–30:100. The electrode also includes a catalyst supported on at least a portion of the carbon particles in the layers. Preferably, the electrode also exhibits dual wettability and reduced electrolyte leakage by the use of a second layer which provides access for the hydrocarbon to the electrolyte and has a weight ratio of thermoplastic to carbon of 30–90:100 which reduces wettability.

The invention is also directed to a method of producing electrodes which is carried out by mixing the thermoplastic, carbon and a leachable material such as zinc oxide in a weight ratio of about 5–30:100:50–200 (based on polyperfluoro-ethylene; graphite: zinc oxide) to obtain a substantially uniform mixture with at least a portion of the carbon particles supporting a catalyst, forming a layer of the mixture, combining the layer with a similar or different layer under pressure to form a laminate, and treating the laminate with at least one chemical agent to dissolve out at least a portion of the filler material to produce controlled wettability and porosity in the electrode. Preferably, the compression step is carried out under pressure between about 1000–3000 p.s.i.g. and at a temperature between about 150–250° C.

The electrode is very suitable for use with either an acid or alkaline electrolyte paste or free fluid. Advantageously, the electrolyte is a free fluid which can be circulated to remove heat and water. Advantageously, for hydrocarbon fuels, the electrolyte is an acid which rejects carbon dioxide produced in the reactions at the fuel electrode.

Although higher temperatures and pressures are useful in preparing the electrode, we have found that reduction of the temperature from 350–400° C. to 150–250° C. and reduction in pressure from 8000 p.s.i.g. to about 1000–3000 p.s.i.g. resulted in an electrode which produced improved performance at the low catalyst loadings. Preferably, the temperature is about 200° C. and the pressure is about 2000 p.s.i.g. It was not unusual to find that the electrodes prepared under the preferred conditions exhibited increased current densities as much as 10 to 20 times over the current densities of the electrodes prepared at the higher temperatures and pressures.

The resultant fuel cell electrode provides a very useful structure for a catalyst composed platinum and a second metal in intimate mixture with the platinum. This catalyst is prepared from the combination of platinum and a second metal by leaching out a portion of the second metal from the catalyst. Advantageously, the second metal is leached when the filler metal is removed, or the second metal may be leached out subsequently. The resultant fuel cell electrode not only exhibits controlled wettability due to the performance of a particular combination of the thermoplastic and carbon but also exhibits controlled porosity and improved performance at low catalyst loadings.

The polymeric thermoplastic may be described as a non-wettable, inert, insoluble acid-resistant material, commonly identified with polyperfluorohydrocarbons, such as Teflon, other fluorohydrocarbons containing chlorine and/or hydrogen such as polytrifluorochloro-ethylene, and polyolefins, such as polyethylene, polypropylene and mixtures of these materials. Advantageously, polyperfluoro-ethylene identified as Teflon is used, and this is a form of a suspension which aids in the mixing of the particles with carbon.

The second ingredient which provides wettability in the electrode support is a wettable carbon. Wettable carbons include the graphitic type and the activated type with the initial wettability depending on the method of preparation. Advantageously, they possess high surface areas in the range of 10 $m.^2/g.$–200 $m.^2/g.$ It is important that the weight ratio of thermoplastic to carbon be in the order of 5–30:100 and preferably 20–25:100 in order to provide a structure which has sufficient wettability to enable the electrolyte and fuel to come in contact with the ctalyst, but at the same time to prevent total flooding of the pores.

A leachable filler material is also used in the preparation of the electrode support to provide controlled porosity. Suitably, this material may be one or more of the leachable metals, metal oxides or derivatives thereof, which may be removed by chemical agents from the mixture. Illustrative materials include aluminum, zinc oxide, zinc chloride and the like.

Advantageously, the electrode is made up of at least two layers and preferably two layers of the compressed mixture of thermoplastic and wettable carbon, containing a current collector. Advantageously, the current collector is embedded in the multi-layer structure by inserting the current collector between two of the layers during the compression step. Since the current collector commonly is made from a metal and may be in the form of a screen, the current collector provides a mechanical support for the layers. Illustrative collectors are made from tantalum, titanium, stainless steel and the like.

Although, the electrode support is usually made up of two layers, other layers may be utilized to confine or restrict certain operations in the electrode to certain sections of the electrode. For example, other layers with lower wettability may be utilized to further localize interface between fuel and the electrolyte.

When both of the layers of the electrode have the same formulation, the performance of the electrode is quite satisfactory. However, when used with a free fluid electrolyte, such layers do not provide an adequate barrier to the leakage of the electrolyte. Therefore, it is preferred that one layer exhibit a significantly lower degree of wettability. In this way, leakage of the electrolyte is avoided and more efficient utilization of the exposed catalyst is accomplished.

The catalyst which is particularly adapted for the fuel cell electrode is composed of platinum and a second metal in intimate mixture with platinum. Some or all of the platinum may be in the intimate mixture. The second metal is commonly a transition metal with an atomic number of 21–76 or an earth metal with an atomic number of 50 or 90. The second metal also is leachable from the mixture at least in part to produce a catalyst having partial voids and an intimate mixture of the second metal and platinum on the surfaces exposed. Preferably, the second metal is nickel, copper, iron, cobalt, manganese, titanium, vanadium and the like.

Chemical agents are utilized to leach out the desired amounts of filler material and second metal in the catalyst. When the electrode is prepared by casting a film of the defined mixture on a metal surface such as aluminum foil and when zinc oxide is utilized as the filler, sodium hydroxide is very useful as a chemical agent for removing the aluminum foil and zinc oxide. When the second metal is nickel or copper, nitric acid is very useful for removing these metals. Other chemical agents may be easily determined for other filler materials and second metals.

The following description of general preparation and testing procedures further illustrates the general conditions useful in preparing electrodes of this invention and provides a further understanding of the following examples.

PREPARATION AND TESTING PROCEDURES (1) *Forming the controlled wettable electrodes.*—The controlled wettable electrodes were fabricated by a general procedure, as described below. Appropriate amounts of 5 or 10% unleached catalyzed graphite powder were blended with a quantity of powdered zinc oxide. To the mixture was added a predetermined volume of Teflon emulsion. The amount added was determined by the degree of wetproofing desired in the product. For controlled-wetting layers smaller volumes of the dispersion were used.

The slurry of catalyzed graphite, zinc oxide and Teflon emulsion was spread uniformly on a piece of aluminium foil to cover the desired area. The cast layer was dried in air. Two such dried layers and a metal current collector were assembled to make one electrode with the collector mounted internally. The collector consisted of 8 milli-inch thick expanded tantalum foil. The sandwich was placed between the plates of a hot press and was compressed at temperatures of from 150 to 400° C. and pressures of from 2000 to 8000 p.s.i. for times of about five minutes. The pressed electrode was cooled and the aluminum foils were stripped by soaking the electrode in 10–20% sodium hydroxide solution. This procedure also removed part of the zinc oxide spacer material which served to provide a controlled degree of porosity in the finished electrode. For removal of the aluminum foils and zinc oxide, hydrochloric acid could alternately be used. Next, the catalyst was activated by treatment of the electrode successively with 5, 10 and then 15% nitric acid followed by a soak in the acid to be used in testing. The nitric acid dissolves the excess second metal in the catalyst.

(2) *Preparing the catalyst.*—The catalysts were made by a general procedure, as described below. Each catalyst was applied to carbon supports by successive impregnations with appropriate amounts of platinum salts and salts of the second metal, followed by chemical reduction to the metals. Amounts of salt are chosen to contain a weight of the metals equal to a percentage of the initial weight of the support carbon. The intended platinum weight percentages were typically 1, 5 or 10%, with an excess of second metal. After reduction to the metals the product was strongly heated to form an intimate mixture. Thermal treatment and the subsequent cooling step are carried out in an inert atmosphere of nitrogen or argon. The excess second metal is then removed from the intimate mixture by leaching successively in solutions of nitric acid and/or sulfuric acid.

This procedure results in an active catalyst of high specific surface area. In the examples given below two support carbons were used. For the controlled wettable electrodes a powdered graphite having a specific surface area of about 11 m.$^2$/g. was used. The catalyst was applied to the powder and leaching of the excess second metal was done after the catalyzed carbon was formed into an electrode. For the carbonplate electrodes, porous graphite blocks were cut into plates of appropriate size and the catalyst was applied to the internal and external surfaces of the plates by the above procedures.

(3) *Testing procedure.*—The electrodes of the examples were tested as propane anodes, ethylene anodes, or oxygen cathodes in half cells or in complete fuel cells. Half-cell tests were made in 10% sulfuric acid at 100 p.s.i.g., pressure and 125–150° C. The pressure was used to prevent boiling of the electrolyte. The whole fuel cells tests were made with 85% phosphoric acid electrolyte at 0 p.s.i.g. pressure and 150° C. The fuel feed gas was humidified by passage through a heated bubbler containing water. Water was added to provide reaction water at the anode and to prevent concentration of the electrolyte by water depletion. The electrolytes were used as pastes containing silica gel. Electrical measurements were made with a modified Kordesch-Marco bridge. The results reported are corrected for IR losses in the cell. Half cell results are reported vs. the hydrogen reference electrode in the same solution.

The following examples serve to illustrate some embodiments of the invention. It is understood that these are given by way of exemplification and do not in any way serve as limitations on the present invention.

Example I

Several electrodes were made from graphite containing 5% by weight of platinum, Teflon, and zinc oxide. These electrodes were hot-pressed at different temperatures and pressures and made up of different weight ratios of Teflon-to-graphite. Performance data for these electrodes are in Table I located below.

The electrodes were prepared by making a soft paste of uniform consistency. In the preparation, graphite (containing about 5% by weight platinum) and zinc oxide were ground and mixed in a mortar. Then water and Teflon emulsion were added slowly and with continuous stirring until a paste of uniform consistency was obtained. The paste was then applied with a small brush on predetermined areas of aluminum foils and dried in an oven at 80°–90° C. After drying, another coat of paste was applied to cover the cracks and pinholes developed in the film as a result of drying. The films were dried again at 80°–90° C.

Two pieces of aluminum foils with equal surface area were hot-pressed together, with a screen of tantalum (about 10 mils thick) in between the layers for about 4 to 5 minutes and kept under pressure to cool to room temperature. The aluminum foils covering the electrode were dissolved in NaOH, after which the electrode was washed with hot distilled water several times and dried.

Analysis of the electrode showed a platinum content of about 3 to 4% by weight and less than 0.02% zinc by weight. The electrodes were about 20 mils thick and exhibited varying degrees of wettability depending upon the amount of Teflon used in their fabrication.

TABLE I.—SURFACE AREAS OF TEFLON-BONDED-GRAPHITE ELECTRODES CONTAINING 5% Pt, AT VARIOUS TEFLON-TO-GRAPHITE RATIOS AND HOT-PRESS TEMPERATURES AND PRESSURES

| Electrode No. | Hot Pressing Conditions | | Teflon-to-Graphite, Weight Ratio | Platinum Surface Area, m.$^2$/g Platinum |
|---|---|---|---|---|
| | Temp., °C. | Press., p.s.i. | | |
| 1 | 365 | 8,000 | 0.8–0.9 | 0.5–0.6 |
| 2 | 365 | 2,000 | 0.8–0.9 | 3.6–4.4 |
| 3 | 275 | 2,000 | 0.8–0.9 | 4.4–6.0 |
| 4 | 250 | 2,000 | 0.40–0.45 | 6.0–8.0 |
| 5 | 200 | 2,000 | 0.40–0.45 | 8.0–10.8 |
| 6 | 250 | 2,000 | 0.20–0.25 | 8.0–10.0 |
| 7 | 200 | 2,000 | 0.10–0.12 | 10–12 |
| 8 | 150 | 2,000 | 0.10–0.12 | 10–13 |

The above results demonstrate the beneficial effect of lower hot-pressing conditions and lower Teflon to graphite weight ratios. Electrode 7, made at 200° C. and 2000 p.s.i. with a Teflon-to-graphite weight ratio of 0.10–0.12, exhibited a catalytic surface area of 10 to 12 m.$^2$/g., whereas electrode 1, made at 365° C. and 8000 p.s.i. with a Teflon-to-graphite weight ratio of 0.8–0.9, exhibited a catalytic area of only 0.5–0.6. The increase in surface area between the two electrodes is approximately 20 times, which is considered quite remarkable. Comparisons between electrodes 1 and 2 and between 2 and 3 also show the beneficial effect of the lower hot-pressing conditions with a constant Teflon-to-graphite ratio, while a comparison between electrodes 5 and 7 show the beneficial effect of a lower Teflon-to-graphite ratio with constant hot-pressing conditions.

Example II

Four of the electrodes prepared in Example I were tested in an experimental pressurized half cell by the procedure outlined above, but with ethylene fuel. Performance data are shown in Table II located below.

TABLE II.—PERFORMANCE OF SOME ELECTRODES IN AN EXPERIMENTAL PRESSURIZED HALF CELL WITH ETHYLENE FUEL

| Electrode No. | Hot Pressing Conditions | | Teflon-to-Graphite, Weight Ratio | Platinum Surface Area, m.$^2$/g. | Limiting Current Density, ma./cm.$^2$ |
|---|---|---|---|---|---|
| | Temp., °C. | Press., p.s.i. | | | |
| 1 | 365 | 8,000 | 0.8–0.9 | 0.5 | 1 |
| 2 | 275 | 2,000 | 0.8–0.9 | 3.6 | 10 |
| 3 | 200 | 2,000 | 0.40–0.45 | 6.0 | 20 |
| 4 | 200 | 2,000 | 0.20–0.25 | 10.0 | 40 |

The above results demonstrate the remarkable increase in limiting current density with lower hot-pressing conditions and wtih lower Teflon-to-graphite weight ratios. As shown by Table II, electrode 2 (prepared at 275° C. and 2000 p.s.i.) produced a limiting current density of about 10 times that of electrode 1 (prepared at 365° C. and 8000 p.s.i.). In addition, electrode 4 made with a lower Teflon-to-graphite weight ratio exhibited twice the limiting current density compared to electrode 3.

Example III

Four electrodes were prepared to compare the performance of the electrodes with controlled wettability, with electrodes of the non-waterproof carbon plate type in complete fuel cells operating on propane and oxygen at 150° C. and 0 p.s.i.g. in concentrated $H_3PO_4$ electrolyte. The results are shown in Table III located below.

Two of the electrodes, 1a and 1b, were prepared according to procedures described in Example I except that the catalyst was a platinum-nickel catalyst containing about 10% platinum and about 50% nickel. The procedure for making this catalyst was discussed above. The Teflon-to-carbon plus catalyst ratio was about 0.225. The treatment for the removal of the zinc also provided a removal of at least part of the nickel to improve the catalyst activity. The finished electrodes had about 1.19 g. of coatings, consisting of leached platinum-nickel catalyst, carbon and Teflon on the tantalum collectors. Analysis of the coatings indicated catalyst loadings of 1.63 and 1.46 mg./cm.$^2$, respectively. The two electrodes were mounted in the same cell, containing 85% $H_3PO_4$ with electrode 1a as the propane anode and 1b as the oxygen cathode.

Two non-wetproof carbon-plate electrodes were prepared for testing under the same conditions. Electrode 2a contained the same catalyst as the electrodes 1a and 1b. The final catalyst loading was about 2.7 mg./cm.$^2$. This electrode was used as the propane anode in the test. Electrode 2b was similar except that the catalyst was prepared from platinum and copper rather than platinum and nickel. This catalyst had been found to be better for use in oxygen cathodes and was therefore used in the test. The catalyst loading was 3.2 mg./cm.$^2$.

TABLE III.—TESTS OF PROPANE-OXYGEN CELLS IN CONCENTRATED $H_3PO_4$ AT 150° C. AND 0 P.S.I.G.

| Current Density, ma./cm.$^2$ | Teflon-Bonded Electrodes 1a=propane 1b=oxygen IR-Free Voltage, volts | Carbon Plate Electrodes 2a=propane 2b=oxygen IR-Free Voltage, volts |
| --- | --- | --- |
| 0 | 0.84 | 0.68 |
| 4 | 0.59 | 0.15 |
| 8 | 0.51 | |
| 12 | 0.46 | |
| 16 | 0.43 | |
| 20 | 0.39 | |
| 24 | 0.36 | |
| 28 | 0.34 | |
| 32 | 0.33 | |
| 35 | 0.30 | |
| 36 | 0.25 | |
| 40 | | |

As shown by the above data, the fuel cell operated with the Teflon-carbon electrodes produced a current density in the order of 36 ma./cm.$^2$ at 0.25 volt; whereas, the fuel cell using carbon plate electrodes produced a current density of only 4 ma./cm.$^2$ at 0.15 volt.

*Example IV*

Electrode 1 was prepared from mixtures of Teflon and catalyzed carbon with different weight ratios of these two ingredients. The carbon contained 5 weight percent platinum as catalyst. In one mixture, the ratio of Teflon-to-carbon was about 0.9. In the other mixture, the weight ratio was about 0.225. The mixtures were thinned by additions of distilled water, stirred well to form a paste of uniform consistency and spread on predetermined area on two pieces of aluminum foil and dried on a hot plate at temperatures of 80–100° C. The films thus obtained were pressed together face-to-face with a screen of tantalum of the same area as the films. This combination was pressed in a hydraulic press at 7000–14000 p.s.i. and 400° C. for two minutes. Then the plates containing the electrode were taken out, kept under pressure until they cooled at room temperature. When at room temperature, the excess aluminum foil of the electrode was removed. The aluminum foils were then dissolved by a solution of NaOH. The electrode was washed several times in hot distilled water and diluted solution of sulfuric acid and further rinsed with distilled water and dried in the air. The electrode thus obtained was quite wettable on one side and relatively non-wettable on the other side.

This electrode was tested experimentally with a paste electrolyte with the side containing the lower Teflon-to-carbon ratio facing the electrolyte. The polarization data of this electrode operating in the pressurized half-cell on ethylene fuel at 125° C. and 150° C. are shown in Table IV below together with the data for a 5 weight percent electro-deposited platinum-on-carbon-cloth electrode, 2, tested under the same conditions. As shown in Table IV, above 2 to 5 times more current could be drawn from the dual layer electrode than from the other electrode.

TABLE IV

| Electrode | Temperature, ° C. | Current Density at 0.45 v. vs. Hydrogen, ma./cm.$^2$ |
| --- | --- | --- |
| 1 | 125 | 2.7 |
| 2 | 125 | 6.5 |
| 1 | 150 | 5 |
| 2 | 150 | 26 |

While the invention has been described in conjunction with specific examples thereof, these are illustrative only. Accordingly, many alternatives, modifications, and variations will be apparent to those skilled in the art in the light of the foregoing description, and it is therefore intended to embrace all such alternatives, modifications, and variations as to fall within the spirit and broad scope of the appended claims.

We claim:

1. A multi-layer fuel cell electrode suitable for use in conjunction with an electrolyte in the direct oxidation of hydrocarbons at low temperatures below about 300° C., said electrode exhibiting controlled wettability and improved performance at low catalyst loadings below about 20 g./ft.$^2$, and comprising at least two adjacent layers containing a current collector, each layer being composed of a compressed combination of particles of a non-wettable, inert, insoluble, acid resistant, polymeric thermoplastic and particles of wettable carbon having a size in the range of 10 m.$^2$/g.–200 m.$^2$/g., at least one of said layers being wettable by the electrolyte but having pores of sufficient size to prevent total flooding of the layer and having a weight ratio of thermoplastic to carbon of about 5–30:100, said electrode also including a catalyst supported on at least a portion of the carbon particles in said layers.

2. The fuel cell electrode of claim 1 wherein said catalyst comprises a layer of platinum and a second metal in intimate mixture with the platinum, said layer having a plurality of internal exposed surface areas with at least a portion of said intimate mixture being exposed on said surface areas.

3. The fuel cell electrode of claim 1 wherein said electrode comprises two of said layers.

4. A multi-layer fuel cell electrode suitable for use in conjunction with an electrolyte in the direct oxidation of hydrocarbons at low temperatures below about 300° C., said electrode exhibiting controlled wettability, improved performance at low catalyst loadings below about 20 g./ft.$^2$, and reduced leakage of electrolyte; said electrode comprising at least two adjacent layers containing a current collector, each layer being composed on a compressed combination of the thermoplastic and carbon particles of claim 1, a first of said layers being wettable by the electrolyte but having pores of sufficient size to prevent total flooding of the layer and having a weight ratio of thermoplastic to carbon of about 5–30:100, a second of said layers providing access for the hydrocarbon to the electrolyte, exhibiting reduced wettability by the electrolyte resistant to flooding and having a weight ratio of thermoplastic to carbon of about 30–90:100, said electrode also including a catalyst supported on at least a portion of the carbon particles in said layers.

5. The fuel cell of claim 4 wherein said catalyst comprising a layer of platinum and a second metal in intimate mixture with the platinum, said layer having a plurality of internal exposed surface areas with at least a portion of said intimate mixture being exposed on said surface area.

6. The fuel cell electrode of claim 4 wherein said electrode comprises two of said layers.

7. A method of producing a fuel cell electrode suitable for use in conjunction with a liquid electrolyte in the direct oxidation of hydrocarbons at low temperatures below about 300° C., said electrode exhibiting controlled wettabiilty and porosity and improved performance at low catalyst loadings below about 20 g./ft.$^2$, which method comprises mixing inert, insoluble, acid resistant, polymeric thermoplastic, wettable carbon having a size in the range of 10 m.$^2$/g.–200 m.$^2$/g., and a leachable filler material in the weight ratio of 5–30:100:50–200 to obtain a substantially uniform mixture, at least a portion of said carbon particles supporting a catalyst, forming a layer of said mixture, combining said layer with at least one other layer of said thermoplastic, carbon and filler material under pressure to form a laminate, and treating the laminate with at least one chemical agent to dissolve out at least a portion of the filler material to produce controlled wettability and porosity in the electrode.

8. The method of claim 7 wherein said catalyst comprises platinum and a second metal in intimate mixture with the platinum.

9. The method of claim 7 wherein said second layer is made from a Teflon to carbon to filler material in a weight ratio of 30–90:100:50–200.

10. A method of producing a fuel cell electrode suitable for use in conjunction with a liquid electrolyte in the direct oxidation of hydrocarbons at low temperatures below about 300° C., said electrode exhibiting controlled wettability and porosity, improved performance at low catalyst loadings below about 20 g./ft.$^2$, and reduced leakage of electrolyte, which method comprises mixing particles of a non-wettable, inert, insoluble, acid resistant polymeric thermoplastic; carbon with a size in the range of 10 m.$^2$/g.–200 m.$^2$/g., and a leachable material in a respective weight ratio of about 5–30:100:50–200 and 30–90:100:50–20 to form two substantially uniform mixtures, at least a portion of said carbon supporting a catalyst comprising platinum and a second metal in intimate mixture with the platinum, forming at least two layers of said mixtures, combining said layers with a current collector under pressure between about 1000–3000 p.s.i.g. and at a temperature between about 150–250° C. to form a laminate, and treating said laminate with at least one chemical agent to dissolve out at least a portion of the filler material and said second metal to produce controlled porosity and catalyst activity in the electrode.

11. The method of claim 10 wherein said temperatures, pressure, and weight ratio of a Teflon:carbon:filler material are 20° C., 2000 p.s.i.g., and 20–25:100:100.

12. The method of claim 11 wherein said chemical agent is sodium hydroxide for the filler material and nitric acid for the catalyst.

No references cited.

WINSTON A. DOUGLAS, *Primary Examiner.*

A. SKAPARS, *Assistant Examiner.*

UNITED STATES PATENT OFFICE
CERTIFICATE OF CORRECTION

Patent No. 3,306,779   February 28, 1967

Robert J. Flannery et al.

It is hereby certified that error appears in the above numbered patent requiring correction and that the said Letters Patent should read as corrected below.

Column 1, line 54, for "providse" read -- provides --; column 2, line 35, for "providse" read -- provides --; column 3, line 41, for "ctalyst" read -- catalyst --; column 8, line 9, for "above" read -- about --; column 10, line 9, for "30-90:100:50-20" read -- 30-90:100:50-200 --; line 24, for "20° C" read -- 200° C --.

Signed and sealed this 26th day of September 1967.

(SEAL)
Attest:

ERNEST W. SWIDER
Attesting Officer

EDWARD J. BRENNER
Commissioner of Patents